United States Patent
Kaufman

[11] Patent Number: 6,035,768
[45] Date of Patent: Mar. 14, 2000

[54] PORTABLE HEAT UNIT USABLE AS AN OVEN, COOKSTAND, BARBECUE, GRILL OR HEATER

[76] Inventor: Kenneth L. Kaufman, 6903 Amestoy Ave., Van Nuys, Calif. 91046

[21] Appl. No.: 08/651,046

[22] Filed: May 17, 1996

Related U.S. Application Data

[63] Continuation-in-part of application No. 08/333,854, Nov. 3, 1994, Pat. No. 5,517,903.

[51] Int. Cl.[7] .............................. A47J 37/00; F24C 1/16
[52] U.S. Cl. ..................... 99/449; 126/9 R; 126/275 R
[58] Field of Search .................... 126/9 R, 9 B, 126/275 R; 99/449

[56] References Cited

U.S. PATENT DOCUMENTS

| | | | |
|---|---|---|---|
| 156,470 | 4/1874 | Warner | 249/172 |
| 1,261,566 | 4/1918 | Lewitzky | 249/172 |
| 1,596,826 | 7/1926 | Gregory | 126/9 R |
| 1,714,379 | 5/1929 | Kratz . | |
| 2,244,935 | 6/1941 | Binger | 126/9 R |
| 3,698,376 | 10/1972 | Webb | 126/9 R |
| 3,828,966 | 8/1974 | Martin | 220/7 |
| 3,841,298 | 10/1974 | Sellors | 126/9 A |
| 4,106,486 | 8/1978 | Lee | 126/369 |
| 4,126,116 | 11/1978 | McCallum | 126/9 R |
| 4,149,514 | 4/1979 | Latouf | 126/9 R |
| 4,164,930 | 8/1979 | Johnston | 126/38 |
| 4,284,058 | 8/1981 | Lütz | 126/9 R |
| 4,363,313 | 12/1982 | Smith | 126/9 R |
| 4,368,727 | 1/1983 | Higgins et al. | 126/25 C |
| 4,455,992 | 6/1984 | Hsiao | 126/9 R |
| 4,630,593 | 12/1986 | Gremillion | 126/25 R |
| 4,646,711 | 3/1987 | Oliphant | 126/9 R |
| 4,681,083 | 7/1987 | Shu | 126/9 R |
| 4,709,827 | 12/1987 | Jaillet et al. | 220/4 D |
| 4,714,013 | 12/1987 | Telfer | 99/449 |
| 4,726,349 | 2/1988 | Gehrke | 126/9 R X |
| 4,779,605 | 10/1988 | Smith et al. | 126/33 |
| 4,920,873 | 5/1990 | Stevens | 99/339 |
| 4,922,887 | 5/1990 | Foxford | 126/41 R |
| 4,924,844 | 5/1990 | Bransburg | 126/9 R |
| 4,958,618 | 9/1990 | Davidson | 126/9 B |
| 4,962,696 | 10/1990 | Gillis | 99/340 |
| 5,045,672 | 9/1991 | Scott | 219/439 |
| 5,119,799 | 6/1992 | Cowan | 126/9 R |
| 5,119,800 | 6/1992 | Roberts et al. | 126/377 |
| 5,243,961 | 9/1993 | Harris | 126/9 R |
| 5,287,800 | 2/1994 | Orednick | 99/449 |
| 5,303,691 | 4/1994 | Armistead | 126/9 R |

*Primary Examiner*—Reginald L. Alexander
*Attorney, Agent, or Firm*—Daniel L. Dawes

[57] ABSTRACT

A portable heat unit is described. The heat unit is useful as an oven, barbecue, griddle, etc. The heat unit comprises a body, a lid, a cooking support member such as a grill rack or oven plate and a brace. The body comprises a number of rectangular panels joined to form an open-ended polyhedron such as a box. The panel joints are movable, and preferably comprise piano hinges, thus rendering the body collapsible. When in use, the stand is rendered noncollapsible by installation of the brace. The brace comprises a rigid member which is placed between two panels to permit control of the burning of the fuel, heat flow, temperature and to define an opening through which the fuel and food may be conveniently accessed.

17 Claims, 7 Drawing Sheets

PORTABLE HEAT UNIT USABLE AS AN OVEN, COOKSTAND, BARBECUE, GRILL OR HEATER

The present application is a continuation-in-part application of U.S. patent application Ser. No. 08/333,854, filed Nov. 3, 1994 now U.S. Pat. No. 5,517,903, entitled "An Improved Collapsible and Portable Chafing Dish" and issued as U.S. Patent.

BACKGROUND OF THE INVENTION

1. Field of the Invention

The present invention relates generally to portable, collapsible heat units which can be interchangeably used as ovens, cook stands, grills, barbecues and heaters.

2. Description of Related Art

In certain environments, such as in outdoor cooking and in catering, it is desirable that a heat unit such as an oven or barbecue be versatile for cooking, be compact when transported and stored, and be durable. Caterers, backpackers, campers, hikers and military personnel find useful such portable heat units. In catering, the food may be prepared in the caterer's kitchen but the food may be served elsewhere. Alternatively, the caterer may wish to cook or barbecue food on-site, thus requiring transportation of an appropriate heat unit to the site.

Heat units typically require a heat source for cooking the food. Such a heat source may be a candle or a fuel can, such as manufactured under the trademark, STERNO, as well as charcoal, wood or gas.

Portable heat units are often expensive to manufacture, and even when robustly made, generally have a limited life due to repeated or rough handling. In camping, the heat unit is exposed to repeated jostling and may be dropped or blown over by wind. Similarly, in mobile catering, the heat units must be transferred from a storage space in the catering kitchen to the catering truck, transported to the catering site and then set up, for example on a buffet table at the catering site. After the catering service is rendered, the process is reversed. Repeated rough handling in this type of environment eventually results in damage to the heat unit.

Heat units of a permanent nature have the advantage of high heat. In contrast, portable heat units typically suffer from extensive heat loss and very often cannot reach sufficiently high temperatures for baking or broiling. Thus, cooking time may be relatively long and the food may be poorly cooked.

Another feature of permanent heat units is that they provide precise control of the cooking process. For example, the cook may control the temperature of an oven or the flame size of a burner on a stove. Both temperature and heat flow are important in cooking, and a permanent heat unit typically provides this. However, portable heat units typically do not allow for control of temperature or heat flow. Thus, food prepared from a portable heat unit may be overcooked, undercooked or unevenly cooked.

Typically, portable units are dedicated to one type of application and are therefore usable only as a cookstand, only as an oven, only as a barbecue or only as a heater. Therefore, what is needed is a heat unit which by means of simple modification not requiring any tools can be used for all of these uses.

It is therefore a first object of the invention to provide an oven, cook body, barbecue and heater unit which can be compactly stored and transported, but which is neither bulky nor prone to damage by ordinary rough handling. It is a further object of the invention to provide a device which is inexpensive and simple to manufacture. It is a further object of the invention to provide a device which can achieve relatively high temperatures, and also which permits control of the temperature and heat flow. These objects and others are provided by the portable heat unit of the present invention.

BRIEF SUMMARY OF THE INVENTION

In accordance with the present invention, there is provided a portable heat unit which is light, compact and efficient. In accordance with the invention, the heat unit may achieve relatively high temperatures, and the temperature and heat flow may be controlled. The preferred embodiment of the invention is a heat unit comprising a lid, an oven plate, a grill rack onto which the heat unit plate rests, a collapsible body into which the grill rack rests, and a brace. The collapsible body is preferably comprised of four rectangular panels forming a box-like structure, where the box has an open top and bottom. A heat source is provided separate from or in combination with the heat unit near the bottom of the body.

The panels are permanently coupled together so that the body may be folded flat. This is preferably achieved by coupling adjacent panels with flatly folding hinges. The hinge between each of the sides of the body may be integrally formed with each side. In the preferred embodiment the sides fold flatly to a thickness of no more than one-half inch.

One important part of the device is the brace, a rigid member which will temporarily render the collapsible body un-collapsible. In the preferred embodiment, the brace is a tray which also holds and positions the heat source. As a result, a rugged, easily stored, collapsible heat unit is provided.

The collapsible body defines a wind sheltered enclosure into which the heat source is placed. By including vents on the panels and the lid, the interior temperature and heat flow may be controlled. In addition, by providing an access door in a panel, the cook may adjust the heat source, for example, by adding, moving, adjusting a fuel cup cover, or removing a Sterno can.

According to the invention, heat transfer into the area where food will be cooked is maximized. Nominally, this area is the "cooking chamber" which is defined by the grill rack or oven plate (depending on which is installed), the body and the lid. The heat unit of the present invention maximizes heat transfer into the cooking chamber from the heat source while minimizing heat loss below the cooking chamber. This heat loss below the cooking chamber is a significant problem in the prior art. Because this problem is overcome by the present invention, the various vents are provided, along with the thermometer, to allow the cook to adjust the temperature in the cooking chamber appropriately.

The elements of the heat unit can be used as an oven, barbecue, a grill, a cookstand or a heater. A further unexpected advantage of the heat unit of the invention is that, when a normally uncontrollable fuel supply such as Sterno is use, the fuel's burn rate may be slowed, significantly extending the life of the fuel supply. In addition, Sterno fuel may be placed in a cup or pot and selectively covered with an adjustable top.

The invention may be better visualized by now turning to the following drawings wherein like elements are referenced by like numerals.

BRIEF DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE PREFERRED EMBODIMENTS

Throughout this description, the preferred embodiment and examples shown should be considered as exemplars, rather than limitations on the apparatus and methods of the present invention.

Figure 1:
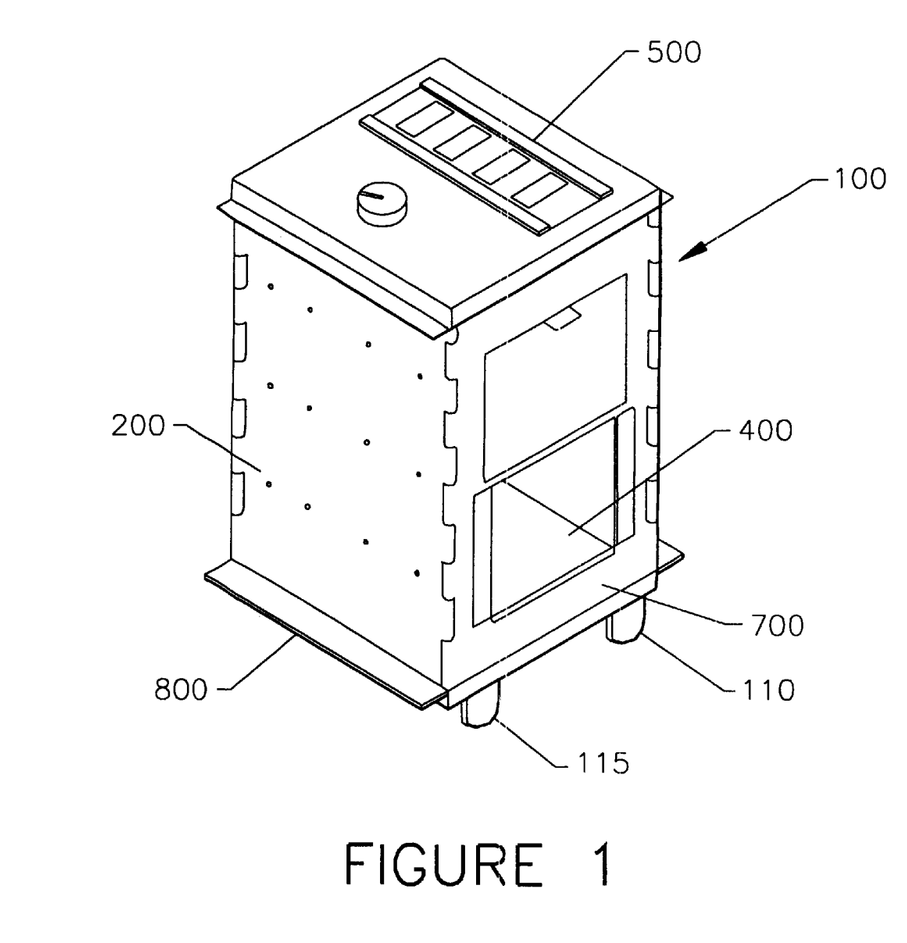
FIG. 1 is an exploded perspective view of a heat unit in accordance with the invention.

Referring now to FIG. 1, there is shown an exploded perspective view of a heat unit in accordance with the invention. The heat unit comprises a body 100, a lid 500, a brace 400 and a bottom support tray 800 to which plural legs 110 are attached. The heat unit is shown in its un-collapsed form. The body 100 comprises the major portion of the heat unit and most of the other components either attach to or rest on some part of the body 100. For example, the lid 500 rests on an upper surface of the body 100. In one embodiment the heat unit as described above can be carried in a stuff bag approximately 10" by 16" by 1", and has a total weight of approximately 5 lbs.

The body 100 comprises a number of joined, rectangular panels. FIG. 1 shows two of these panels, a front access panel 700 and a side panel 200. The body includes a panel opposite the access panel 700—a vent panel—which will be described below. There is also a panel opposite the side panel 200, which is preferably substantially identical to the side panel 200 shown.

The four panels are preferably formed from aluminum alloy sheet preferably of gauge 0.09 or thickness 3 mm, although other materials known to the art and thicknesses may be equivalently used. For example, the panels may be formed of stainless steel, aluminum clad stainless steel, titanium alloys or other combinations of materials which are rugged, sturdy and will survive exposure to heat. The panels, as well as the remainder of the heat unit, is preferably made of materials which are easily cleaned, and most preferably can be washed in a dishwasher. In the disclosed embodiment, the four panels are 10"×8" wide, with the shorter dimension along the bottom.

Although a box-like body 100 is shown, other open-ended polyhedrons are also within the scope of the invention. Thus, a body may have three, five, six or more panels. Preferably, the panels in each embodiment are rectangular, although if there are an odd number of panels, the panels may have to be of differing dimensions.

The lid 500 may be easily removed from the body 100 for access to the cooking chamber (the interior region of the body where cooking takes place). The lid 500 is preferably comprised of aluminum sheet as well, although the lid may be made of other materials which are rugged, sturdy and will survive exposure to heat.

The brace 400 primarily provides lateral rigidity to the body. When installed, the brace 400 effectively locks the body in its un-collapsed form. The brace 400 may be removed to permit the body 100 to be folded into the collapsed form. The brace 400 more preferably is in the form of a fuel tray, and thus can hold, for example, a can of Sterno. The brace 400 may also be used to support or accommodate an alternate heat source, such as charcoal or a gas burner.

Notably, the brace 400 is disposed at the lower end of the body 100. This provides ample space above the brace 400 for cooking. In addition, since heat will rise from the heat source, it is desirable for cooking to be done above the heat source for maximum efficiency and economy.

Figure 10:
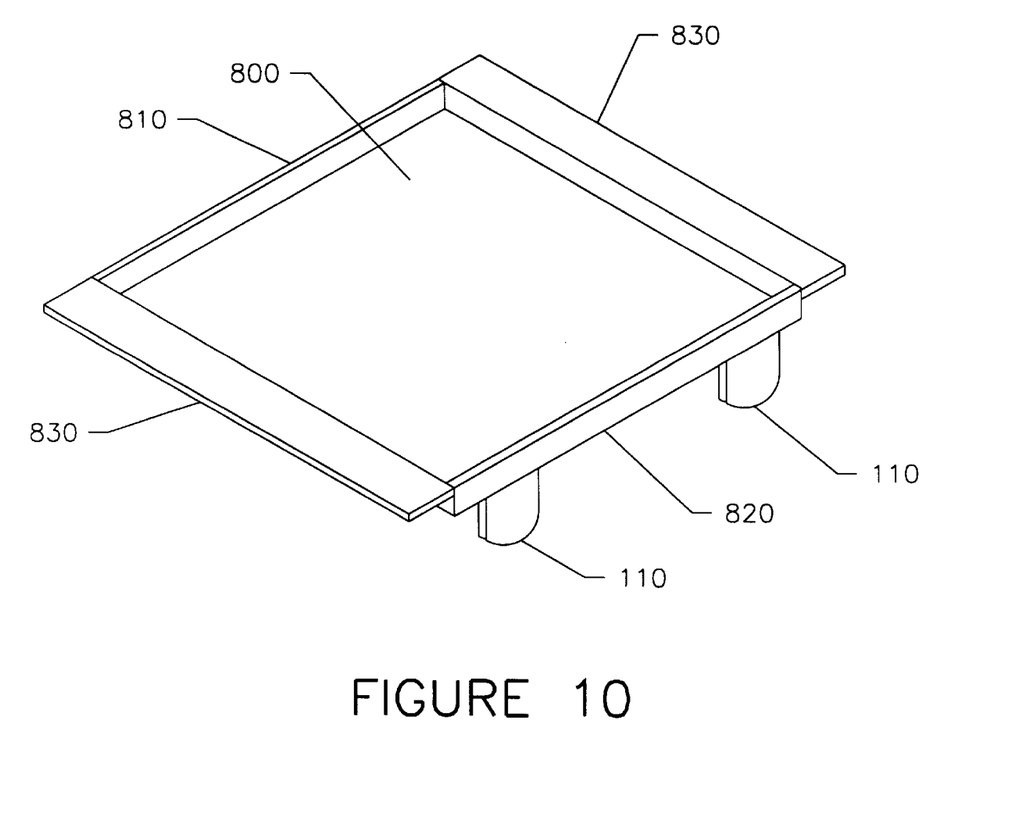
FIG. 10 is a perspective view of the bottom tray for the heat unit.

Body 100 is disposed within on top of bottom tray 800 which is a square metal tray having opposing vertical side walls 810 and 820 which define a square open cavity into which body 100 easily slips and is retained as best depicted in the perspective view of FIG. 10. Opposing side walls 820 are extended to form a horizontal flange 830 to provide a means for lifting and carrying the heat unit when assembled as shown in FIG. 1. The legs 110 provide support for the heat unit and may be connected to tray 800 either by slide-on connectors that engage tray 800 with mating sockets for receiving legs 110, or legs 110 may be directly fixed, screwed or welded into tray 800. As an additional benefit, the legs 110 also raise the body above a supporting surface, reduce the risk of heat damage to the supporting surface from the heat source of the heat unit. In the disclosed embodiment Legs 110 are preferably 1" diameter tubes, 4" in length. The legs 110 too may be formed of aluminum sheet, but preferably include tips 115 made of rubber or other rugged, scratch resistant and skid resistant material.

Figure 8:
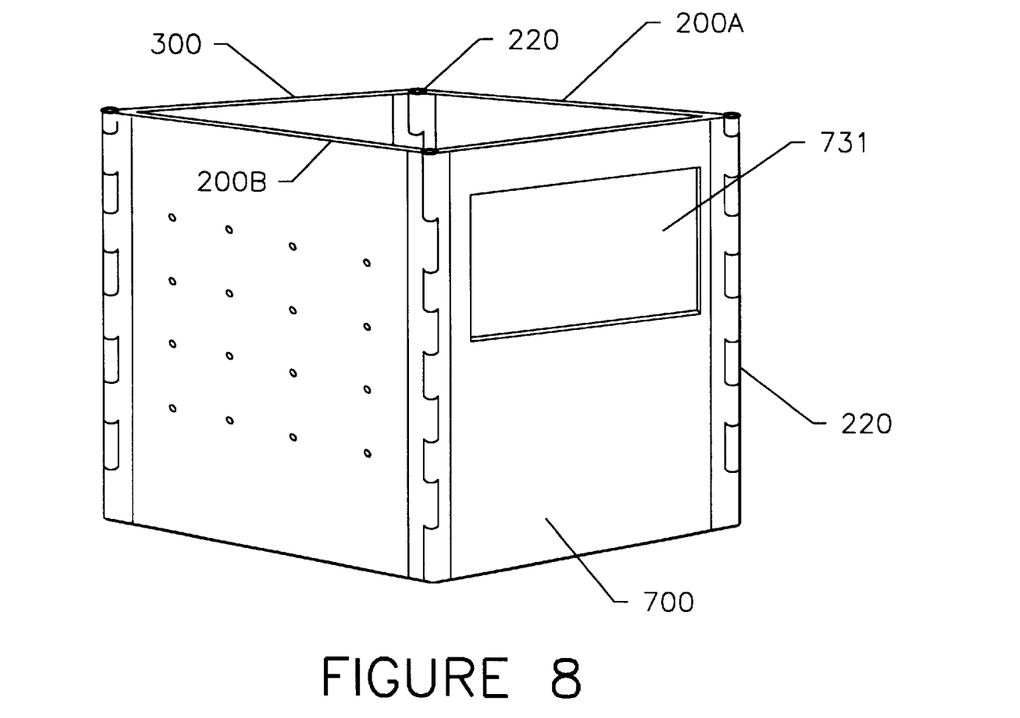
FIG. 8 is a perspective view of the body shown in FIG. 1 shown in a collapsed or flatly folded configuration.

Referring now to FIG. 8 there is shown a perspective view of the body 100 shown in FIG. 1 shown in a collapsed or flatly folded con-figuration. When the body is collapsed, one grill rack 200a is positioned opposite the access panel 700, and the other grill rack 200b is positioned opposite the vent panel 300. However, when unfolded, the access panel 700 will be opposite the vent panel 300 and the first side panel 200a will be opposite the second side panel 200b.

Figure 2A:
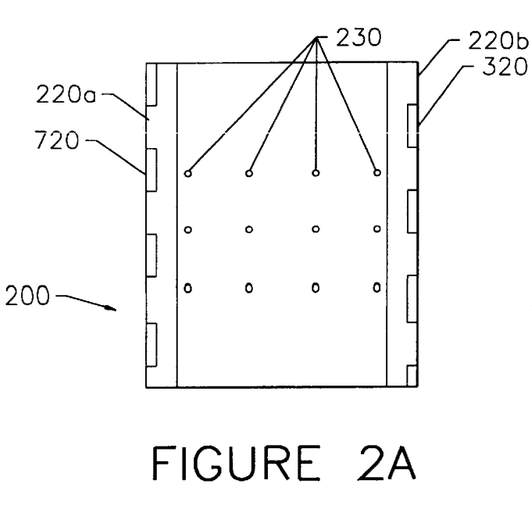
FIG. 2A is a side view of a grill side panel of the device's body.

Referring now to FIG. 2A there is shown a side view of the side panel 200 of the device's body 100. As mentioned, there are preferably two side panels which are substantially the same. Hence, only one is described herein. The side panel preferably includes hinge portions 220a, 220b along each side of a central sheet-like portion 210. The side panel 200 may be formed from a sheet of aluminum to which hinges are attached, or the hinge portions 220a, 220b may be formed from the sheet itself.

Hinge portions of adjacent plates may be joined with a hinge pin (not shown) to form a hinge assembly. The preferred hinge assembly is a piano hinge, although others types of hinges which permit the panels to fold substantially flat and remain joined are within the scope of the invention. For example, the hinge portion 720a on one side of the access panel 700 mates to the hinge portion 220b on the near side of one side panel 200. To ease cleaning, a hinge may be selected which can be disassembled.

The side panel 200 preferably includes a number of holes 230. These holes are spaced to receive a cooking support member, such as a grill rack or oven plate as described below. As can be seen, there are preferably several rows of spaced holes 230, permitting the cooking support member to be placed at different heights above the heat source. In addition this allows for simultaneous multstack cooking of three or more items. However, if a different cooking support member is selected, a different means for supporting the cooking support member may be desirable and included on the side panels 200.

Figure 2B:
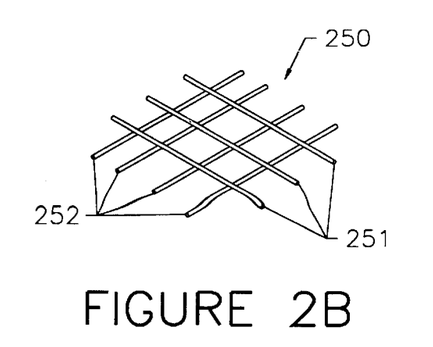
FIG. 2B is a top view of a grill rack of the device.

Referring now to FIG. 2B there is shown a top view of a grill rack 250 of the device. The grill rack 250 preferably comprises a mesh of wires 251, 252 and 253. Preferably, at least some of the wires 252 are longer for engagement into the holes 230 in the side panels 200. The shorter wires 251 of the grill rack are shorter than the width of the side panels 200 so that the rack will fit inside the body. However, the longer wires 252 should be longer than the width of the access panel 700 and the vent panel 300 so that these wires 252 will extend into and through the holes 230 in the side panels 200. Support wires 253 lend addition strength to grill rack 250. Wires 253, which is the illustrated embodiment are approximately 7" long are short enough not to interfere with the insertion or removal of grill rack 250. Wires 253 also provide an increased supporting surface for grill rack 250. With the grill rack installed in the top row of holes 230, the heat unit may be used as a stove. At that and other heights, the heat unit is useful as a barbecue. In addition, operation of the oven with its lid removed and grill rack 250 placed in position below the rim, one or two positions down panel 200, will hold panels 200 and serve as an effective wind break for a cooking pot placed on the oven racks. In the illustrated embodiment, the longer wires 252 are 8½" long, and the shorter wires 251 are 7½" long. The longer wires 252 also include ⅛" buttons on their ends to prevent wires 252 from slipping out of the holes 230.

Figure 3:
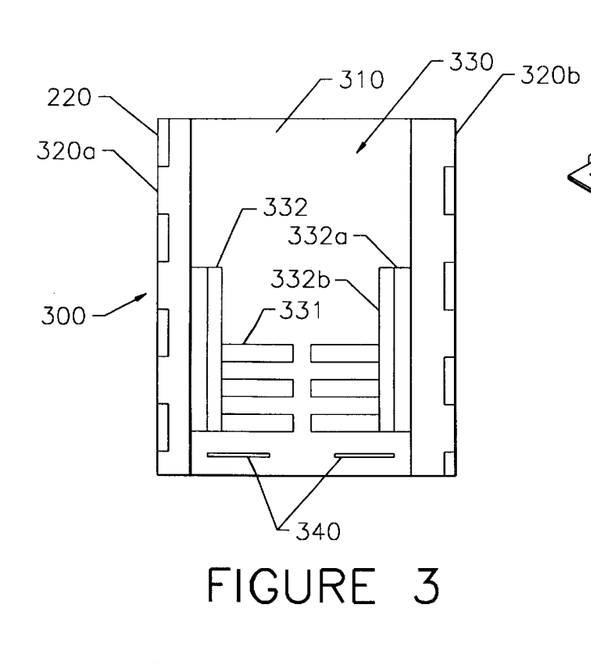
FIG. 3 is a side view of a vent panel of the device's body.

Referring now to FIG. 3 there is shown a side view of the vent panel 300 of the device's body 100. Like the side panels 200, the vent panel 300 preferably includes hinge portions 320a, 320b along each side of a central sheet-like portion 310. The vent panel 300 may be formed from a sheet of aluminum to which hinges are attached, or the hinge portions 320a, 320b may be formed from the sheet itself.

The vent panel 300 also has a vent portion 330. The vent portion 330 includes plural vent apertures 331 and a means for controllably covering the vent apertures 331. In the preferred embodiment, this means for controllably covering the vent apertures 331 comprises a door 750 (as shown in FIG. 7B) and a pair of flanges 332 on either side of the vent apertures 331. The flanges 332 includes an outer portion 332a which is permanently attached to the central portion 310, and an inner portion 332b which is not attached to the central portion 310 and is spaced a small distance away from the central portion 310. With the vent portion 330, the operator may control air flow to the fuel, thereby controlling the fuel's burn rate and the heat emitted from the burning fuel. The oven door is supported by friction and spring compression within its retaining slides.

Figure 4:
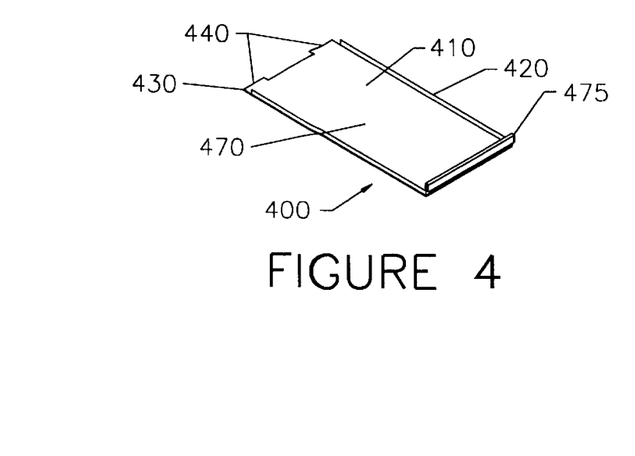
FIG. 4 is an elevated side view of a brace of the device.

A final feature of the vent panel merits attention—a pair of brace apertures 340. The brace apertures 340 substantially take the form of two lateral slits, and in the disclosed embodiment are ¼" wide and 2⅛" long. As will be described below with respect to the brace 400, one end of the brace 400 is inserted into the brace apertures 340 to render the body 100 un-collapsible.

Referring now to FIG. 7B there is shown a side view of an access/vent door 750 of the device. Preferably, the same dimensioned door may be used in conjunction with vent panel 300 and the access panel 700 (as will be described below). The door 750 is preferably of aluminum alloy sheet, and comprises a main portion 752 and a handle 751 disposed at a right angle from the main portion 752. In the illustrated embodiment, the door is 6¼"×3½".

With respect to the vent panel 300, the door 750 is of a size that it will fit over and fully cover the vent apertures 331. In addition, the door is sized to fit between the outer portion 332a of the flanges 332, and under the inner portion 332b of the flanges 332. This effectively and simply holds the door 750 in place, and allows the door 750 to be raised and lowered to control exposure of the vent apertures 331 to outside air. In this manner, the temperature and heat flow inside the heat unit may be at least partially controlled.

Figure 7A:
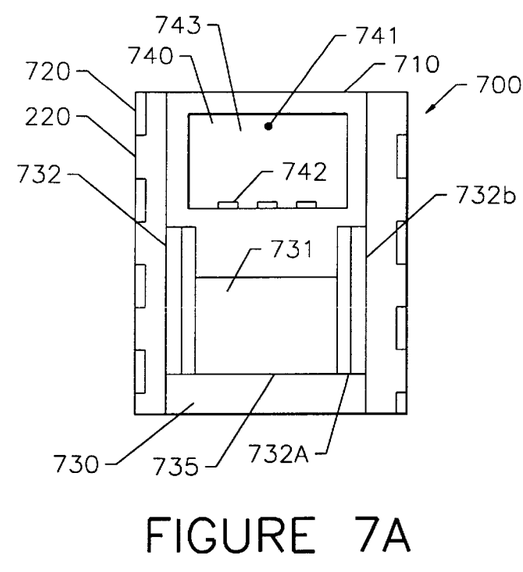
FIG. 7A is a side view of an access panel of the device's body.
Figure 7B:
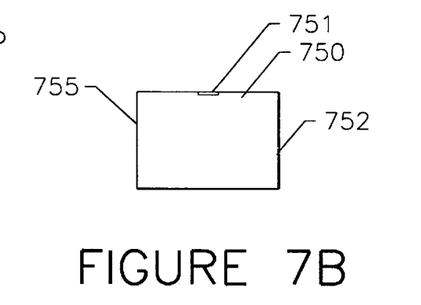
FIG. 7B is a side view of an access/vent door of the device.

Referring now to FIG. 7A there is shown a side view of the access panel 700 of the device's body 100. Like the side panels 200 and the vent panel 300, the access panel 700 preferably includes hinge portions 720a, 720b along each side of a central sheet-like portion 710. The access panel 700 may be formed from a sheet of aluminum to which hinges are attached, or the hinge portions 720a, 720b may be formed from the sheet itself.

The access panel 700 has a lower access portion 730. The lower access portion 730 includes an aperture 731 and a means for controllably covering the aperture 731. In the preferred embodiment, this means for controllably covering the aperture 731 comprises the door 750 shown in FIG. 7B and described above with respect to the vent panel 300. Like the vent panel 300, the access panel 700 preferably includes a pair of flanges 732 on either side of the aperture 731. The flanges 732 include an outer portion 732a which is permanently attached to the central portion 710, and an inner portion 732b which is not attached to the central portion 710 and is spaced a small distance away from the central portion 710.

With respect to the access panel 700, the door 750 is of a size that it will fit over and fully cover the aperture 731. In addition, the door is sized to fit between the outer portion 732a of the flanges 732, and under the inner portion 732b of the flanges 732. This effectively and simply holds the door 750 in place, and allows the door 750 to be raised and lowered for access to the interior of the body 100.

In addition to the lower access portion 730, the access panel preferably includes an upper access portion 740. This upper access portion 740 comprises a door 743, a hinge 742 coupled to the door 743 and the central portion 710 of the access panel 700, and a handle locking mechanism 741. This door 743 is preferably sized to permit access to food cooking within the heat unit, for example when the heat unit is being used as an oven. Accordingly, the door 743 is set above the lowest set of holes 230 in the side panels 200. Having this door 743 is especially useful since oven heat might be lost if the lid 500 were removed, thus avoiding uneven or delayed cooking. Furthermore, grill rack 250 and bake plate 600 should be disposed no less than 2 inches above the Sterno can or other fuel element to thereby promote a good air to fuel mixture. Grill rate 250 and bake plate 600 should be set below opening 740 and hinge 742 to maintain the temperature within the fuel burning compartment when door 743 is opened.

Referring now to FIG. 4 there is shown an elevated side view of the brace 400 of the device. As mentioned above, the brace 400 primarily serves to effectively lock the body 100 in its un-collapsed form, and the brace 400 also preferably serves as a fuel tray to hold, for example, a can of Sterno. The brace 400 may be formed of aluminum or other rigid, light weight and durable which can survive exposure to heat. In the illustrated embodiment, the brace is 6"×8¼".

To render the body 100 un-collapsible, the brace 400 is installed on the body 100 between two opposing panels. In the illustrated embodiment, this is achieved by installing the brace 400 onto the access panel 700 and the vent panel 300. As described above, the vent panel 300 includes brace apertures 340, and the access panel 700 includes an aperture 731. The brace apertures 340 in the vent panel 300 are preferably disposed at approximately the same height as the bottom edge 735 of the aperture 730 to permit the brace 400 to rest substantially horizontally. The brace 400 is longer than the side panels 200, but not as wide as the access panel 700 or the vent panel 300.

The brace 400 comprises a central portion 410 and two ends 470, 430. The central portion 410 comprises a rectangular web. The first end 470 includes an end flange 475, and the second end includes two extend edges 440. The extended edges 440 are sized to fit into and through the brace apertures 340 in the vent panel 300. Brace 400 can be designed to have a male end instead for the female end as depicted. For example, instead of a center indentation between two extended edges 440, a single central tab 440 could be defined on the end edge of brace 400 with the corresponding appropriate modifications made in the panel apertures. In the illustrated embodiment, the extended edges 440 are ¼" long, so that the brace 400 extends ¼" beyond the vent panel 300 when installed. The end flange 475 is sized to rest onto the bottom edge 735 of the access panel's aperture 730. In the illustrated embodiment, the end flange 475 extends up and down from the central portion 410 by ½".

The brace 400 preferably is narrower than and can fit through the access panel's aperture 731. However, the brace 400 may be wider than the aperture 731, but not as wide as the access panel 700 itself. In such a case, the end flange 475 nonetheless must be shorter than the width of the aperture 475. The brace 400 could also include a handle to make it easier to install and remove.

To install the brace 400, the body 100 is first opened to form an open-end box. The access door 750 on the access panel 700 is then raised, and the second end 430 of the brace 400 is inserted through the exposed aperture 730 in the access panel 700. The extended edges 440 of the end 430 moved into the brace apertures 340 of the vent panel 300, and the flange 475 of the brace 400 is allowed to rest on the bottom edge 735 of the access panel's aperture 730. For additional rigidity, the door 750 on the access panel 700 may be lowered and pressed down onto the flange 475.

With the brace 400 installed, the brace will render the body 100 generally uncollapsible. The brace 400 will not slip laterally out of the body 100 because the flange 475 rests on the bottom edge 735 of the access panel's aperture 730, and the two extended edges 440 rest in the brace apertures 340. The brace is preferably sized such that, if the body 100 is jostled, the extended edges 440 are sufficiently long that they will not slip out of the brace apertures 340, and the flange 475 will not pop off of the bottom edge 735 of the access panel's aperture 735. In this way, lateral movement of the panels will cause the access panel 700 and the vent panel 300 to push against the brace 400, with the brace 400 staying rigid to prevent further movement.

Since the brace 400 may also serve as a fuel tray, the aspects of the brace which render it useful as a fuel tray will now be described. The central sheet-like portion 410 which is sufficiently rigid to support the fuel. The brace 400 further includes tray edges 420. With the brace/fuel tray 400 installed in the body 100, the access panel 700, the vent panel 300 and the tray edges 420 form box which prevent the fuel from slipping off the brace/fuel tray 400 as well as adding support and strength to the tray and the complete unit.

Figure 9:
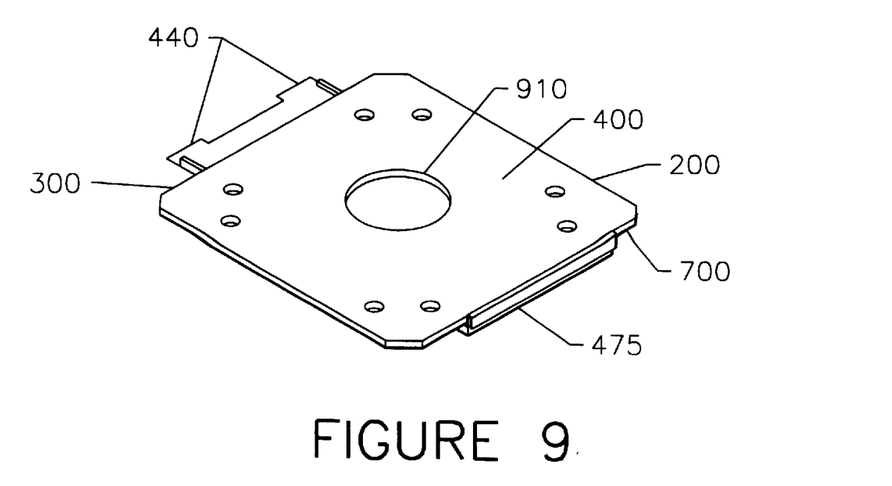
FIG. 9 is a top view of the device with the lid removed.

FIG. 9 is a top view of the device with the lid removed. The referenced parts have been previously explained, although a can of fuel 910 is also shown. As can be seen, the extended edges 440 of the brace 400 extend through the vent panel 300 so that the brace 400 rests against the vent panel 300. Also, brace 400 rests against the access panel 700.

Where the brace 400 does not serve as a fuel tray, the heat source may be provided below the body and separate from the heat unit. For example, the heat unit could be placed over a burner on a range or plumbed for gas.

Figure 5A:
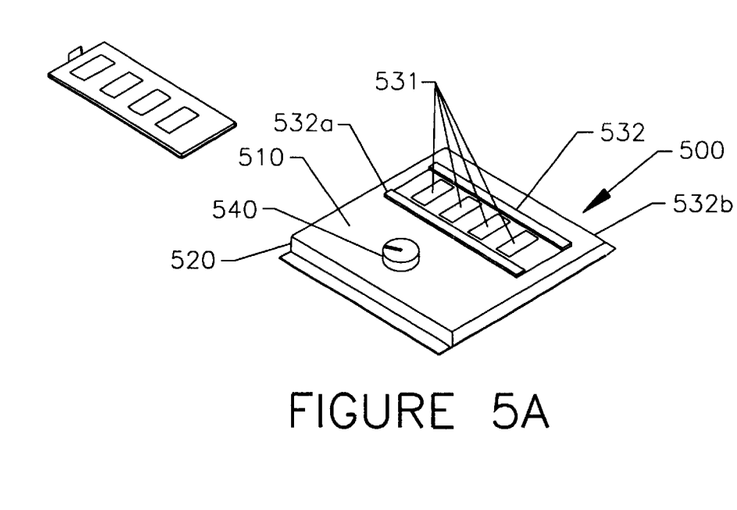
FIG. 5A is an elevated side view of a lid of the device.

Referring now to FIG. 5A there is shown an elevated side view of a lid 500 of the device. The lid 500 preferably includes a central portion 510, side flaps 520, a vent portion 530, a thermometer 540 and two handles 550 extending approximately one inch from both sides of lid 500. The central portion 510 and the side flaps 520 as well as handles 550 may be formed from a single sheet of aluminum alloy with the side flaps 520 as well as handles 550 notched from the sheet and joined at right angles. The thermometer 540 may be of the conventional variety known in the art. In the illustrated embodiment, the lid 500 is 8¼"×8¼", with the side flaps 520 being ½" long, so that the lid 500 fits easily and snugly over the 8" square top surface of the body 100.

Figure 5B:
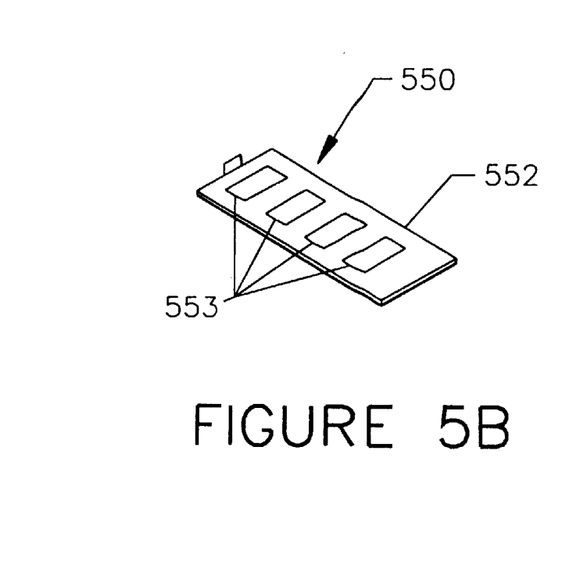
FIG. 5B is an elevated side view of a vent slide control of the device.

The vent portion 530 of the lid 500 is preferably similar to the vent portion 330 of the vent panel 300. Accordingly, the vent portion 530 includes plural vent apertures 531 and a means for controllably covering the vent apertures 531. In the preferred embodiment, this means for controllably covering the vent apertures 531 comprises a door 560 as shown in FIG. 5B and a pair of flanges 532 on either side of the vent apertures 531. The flanges 532 include an outer portion 532a which are permanently attached to the central portion 510, and an inner portion 532b which are not attached to the central portion 510 and are spaced a small distance away from the central portion 510.

The door 560 preferably also includes vent apertures 553 in a central portion 552, plus a handle 551 formed at a right angle to the central portion. The door 560 fits on the lid 500 in the same manner as the door 750 fits into the vent panel 300.

Figure 6:
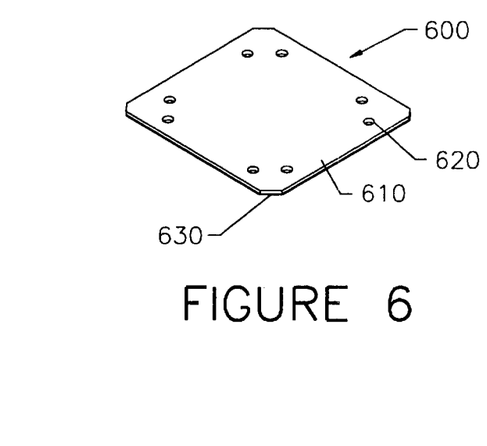
FIG. 6 is a top view of an heat unit chamber plate of the device.

Referring now to FIG. 6 there is shown a top view of an oven plate 600 of the device. The oven plate 600 is preferably formed from a sheet of aluminum alloy and has a square central portion 610 with the corners 630 removed and plural vent holes 620 spaced about the edge of the oven plate 600. The oven plate is preferably approximately 7⅞"×7⅞" and made from aluminum alloy.

The oven plate 600 preferably is placed onto the grill rack 250 after the grill rack 250 has been installed in the body 100. Alternatively, two or more panels of the body 100 may include lips, grooves or notches onto which the oven plate 600 may rest. The oven plate 600 is useful as a cooking surface, and with the body 100 and lid 500 defines an oven-like cooking chamber. The holes 620 increase heat flow into the cooking chamber from below. The corners 630 are preferably removed for easier installation of the oven plate 600 inside the body 100 as well as allowing rising heat to be evenly distributed in the above bake chamber.

As an alternative to the grill rack 250 and oven plate 600 being removable, either of these components could be joined to one of the panels by a hinge or similar means, and folded up against the panel when the body is collapsed. A support, such as the holes or lips described above could be provide to support a second side of the grill rack or oven plate. A similar modification could be made to the brace 400.

As indicated, with the oven plate 600 placed lower in the body 100, the heat unit is useful as an oven. With the oven plate 600 at a higher level and without the vent holes 620, it is useful as a griddle. Furthermore, with or without the oven plate 600, the heat unit is adaptable as a heater, humidifier or sterilizer, as can be appreciated by those of skill in the art.

Figure 11:
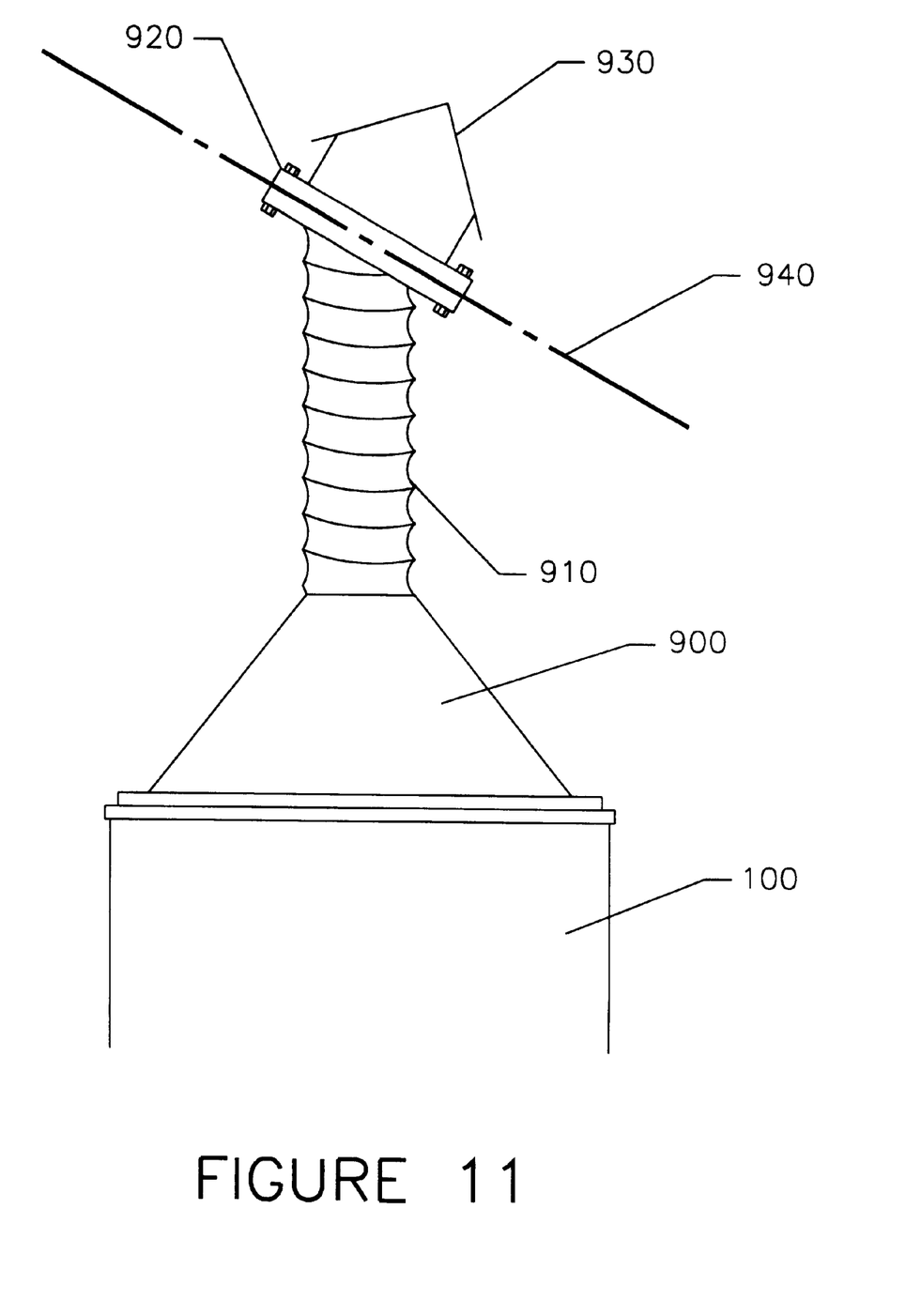
FIG. 11 is a simplified side elevational view of the heat unit used as a space heater with a chimney assemble added thereto.
Figure 12:
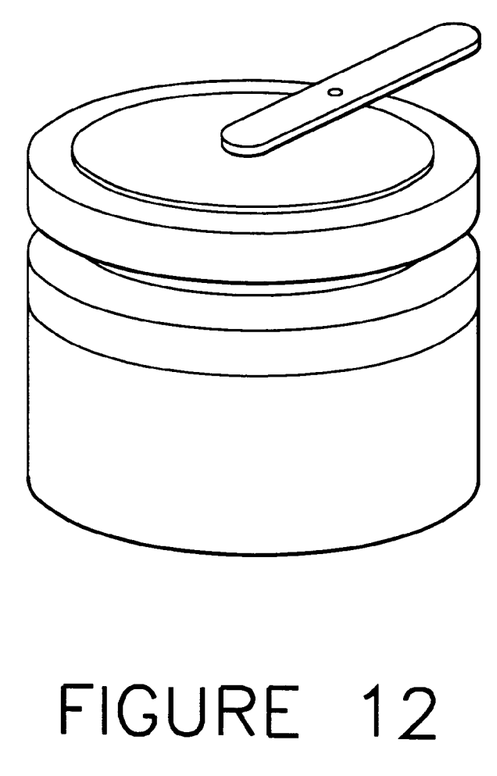
FIG. 12 is a prespective view of a cup or pot having a rotatable cover disposed thereon by which temperature may be controlled.

FIG. 11 illustrates the invention when used as a heater. Body 100 is provided with a funnel shaped canopy 900, which can be placed on top of body 100 in place of lid 500 or over lid 500 when vent portion 530 opened to allow exhaust gases to escape from the top of body 100 into funnel 900, or with oven plate 600 disposed on a grill rack 250 replacing lid 500. Funnel 900 is coupled to a flexible and accordion-pleated tubular chimney, such as made of a metalized foil wound on a helical spring carrier. Any type of chimney, telescopic, expandable or not may be employed. In the illustrated embodiment chimney 910 is coupled through heat resistant gasket assembly 920 which provides the fitting to penetrate the roof 940 of the structure or tent in which the heat unit is used. A conventional rain cap 930 is then coupled to the exterior opening of assembly 920 to provide for wind and rain shielded exhaust of combustion waste gases from the heat unit to the ambient.

It should be noted here that, based upon experimentation, it has been found that the composition and thickness of the materials used can affect the quality of heat transfer in the heat unit. Thus, the qualities of the preferred materials and dimensions are described above. Temperatures from 180 F. to 700 F. have been achieved in the full enclosure provided by body 100, lid 500 and body tray 800 using a single can of Sterno in the illustrated embodiment.

Through the maximization of heat transfer and temperature control provided by the invention, a heat unit uses less fuel, allowing a limited and expensive fuel supply such as Sterno to last longer. Uncontrolled, Sterno will last 2 hours. However, the controlled environment in the described heat unit will allow the Sterno to last significantly longer.

The heat unit of the present invention is light weight, portable and multi-functional. The unit is easy to assemble and disassemble, with no need for tools. An additional advantage is that the heat unit may be used where open flames are not permitted since the heat element may be entirely contained within the heat unit.

Thus it can now be readily appreciated with plate 600 in a position just above the heat source and lid 500 in place, the heat unit functions as an oven. With only a grill rack disposed in body 100 and lid 500 removed, particularly with grill rack 250 mounted at the top of body 100, the heat unit functions as an open flame barbecue. With plate 600 supported by a grill rack 250 at or near the top of body 100, the heat unit functions as a grill plate. With grill rack 250 disposed near or at the top of body 100 or no element disposed in body 100 and with a pot or pan disposed on top of body 100, the unit functions as a cookstand. With the added elements of funnel 900 and the chimney assembly 910, 920 and 930, the heat unit functions as an interior space heater with an exterior vented exhaust.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. A heat unit for use with a heat source, the heat unit comprising:

a plurality of rectangular panels coupled to form an open-ended polyhedron, each adjacent side being coupled together by means of a folding hinge, the polyhedron defining the heat unit's interior; and a brace comprising a rigid member with a flange on an end thereof, the brace temporarily extending between two panels with the flange interlocking with an aperture through one of the two panels to render the open-ended polyhedron rigid.

2. The heat unit of claim 1 further comprising a bottom tray into which said plurality of rectangular panels sit.

3. The portable heat unit of claim 1 wherein the panels include an access panel, the access panel including an aperture providing user access to the heat unit's interior.

4. The portable heat unit of claim 1 wherein the panels include a vent panel, the vent panel having plural vent apertures for controlling air flow into and out of the heat unit's interior.

5. The portable heat unit of claim 1 wherein the panels include two side panels and one of said plurality of means comprises a grill rack, the grill rack comprising plural crossed members, wherein at least some of the members extend from the crosses, the side panels including a plurality of spaced holes into which the extended portion of some of the members may be inserted to support the grill rack.

6. The portable heat unit of claim 5 wherein one of said plurality of means comprises an oven plate disposed on the rack.

7. The portable heat unit of claim 1 further comprising a cooking support member which comprises a substantial flat, thin oven plate.

8. The portable heat unit of claim 7 wherein the oven plate includes plural vent holes defined therethrough.

9. The portable heat unit of claim 8 wherein the vent holes are spaced around the perimeter of the oven plate.

10. The portable heat unit of claim 1 wherein there are four panels, and the panels form an open-ended box.

11. The portable heat unit of claim 1 wherein the brace comprises a fuel tray providing sufficient support for a self-contained heat source.

12. The portable heat unit of claim 1 wherein the brace has a notched end opposite the flanged end, and wherein one panel opposite the flange-engaging panel includes an aperture into which the notched end may be inserted to provide lateral rigidity to the polyhedron.

13. A collapsible heat unit comprising:

a heat source;

a collapsible body into which the heat source is disposed, said collapsible body being comprised of four panels forming a rectangular structure, each adjacent panel being coupled together by means of a folding hinge, a lid and a bottom panel to provide a full enclosure; and a nonextensible member temporarily interacting with two opposing panels of said rectangular structure by means of a flange at one end and an extended edge at the other end thereof and extending between the two panels with said flange interacting with an edge of an aperture through one panel and said extended edge passing through a slot in the other panel to render said collapsible body noncollapsible and to support said heat source, whereby a rugged, easily stored, collapsible heat unit is provided.

14. A heat unit comprising:

a cooking support member for supporting food to be heated;

a collapsible body into which said support member rests, said collapsible body being comprised of four side panels forming a rectangular structure, each adjacent panel being coupled together by means of a flatly folding hinge; and means for temporarily rendering said collapsible body noncollapsible comprising a rectangular tray temporarily attachable along ends of said tray with opposing panels of said heat unit by means of an end flange on said tray interacting with an aperture through one of said panels;

whereby a rugged, easily stored, collapsible heat unit is provided.

15. The heat unit of claim 14 wherein one of the panels is provided with a rectangular aperture through which said rectangular tray can be inserted into the body, the end flange arranged and configured to slip-fit over an edge of said rectangular aperture.

16. The improved heat unit of claim 14 further comprising a heat source and wherein said rectangular tray is a rigid plate disposed between opposing panels of said body to function as a support tray for said heat source, appropriately positioning said heat source beneath said cooking support member.

17. The heat unit of claim 14 wherein said body comprises at least one grill rack supported within said body above said fuel, and at least one skillet plate being supported within said body above said heat source.

* * * * *